United States Patent
Jiang et al.

(10) Patent No.: US 9,929,758 B2
(45) Date of Patent: Mar. 27, 2018

(54) REDUCING RECEIVER DISTORTION CAUSED BY TRANSMITTER SIGNALS

(71) Applicant: Futurewei Technologies, Inc., Plano, TX (US)

(72) Inventors: Hong Jiang, Kernersville, NC (US); Wael A. Al-Qaq, Oak Ridge, NC (US)

(73) Assignee: Futurewei Technologies, Inc., Plano, CA (US)

( * ) Notice: Subject to any disclaimer, the term of this patent is extended or adjusted under 35 U.S.C. 154(b) by 0 days.

(21) Appl. No.: 14/809,840

(22) Filed: Jul. 27, 2015

(65) Prior Publication Data

US 2017/0033813 A1 Feb. 2, 2017

(51) Int. Cl.
*H04B 1/10* (2006.01)
*H04B 17/21* (2015.01)
*H04B 17/14* (2015.01)

(52) U.S. Cl.
CPC .......... *H04B 1/1027* (2013.01); *H04B 17/14* (2015.01); *H04B 17/21* (2015.01)

(58) Field of Classification Search
CPC ......... H04B 1/1027; H04B 17/21; H04B 1/10
USPC .................................. 375/316, 346
See application file for complete search history.

(56) References Cited

U.S. PATENT DOCUMENTS

| 8,948,325 B1* | 2/2015 | Warner | H04B 1/0475 375/297 |
|---|---|---|---|
| 2002/0123371 A1 | 9/2002 | Miyoshi et al. | |
| 2005/0021198 A1 | 1/2005 | Jackson et al. | |
| 2013/0102254 A1* | 4/2013 | Cyzs | H04B 1/126 455/63.1 |
| 2014/0247757 A1* | 9/2014 | Rimini | H04B 1/525 370/278 |
| 2015/0171902 A1* | 6/2015 | Fleischer et al. | 375/285 |

FOREIGN PATENT DOCUMENTS

| CN | 1383628 A | 12/2002 |
| CN | 103312643 A | 9/2013 |
| WO | 2015/028068 A1 | 3/2015 |

OTHER PUBLICATIONS

Andrews et al.; "A Wideband Receiver With Resonant Multi-Phase LO and Current Reuse Harmonic Rejection Baseband"; IEEE Journal of Solid-State Circuits, vol. 48, No. 5, pp. 1188-1198; May 2013.
International Search Report and Written Opinion for PCT/CN2016/091572, dated Oct. 8, 2016. 11 pages.

* cited by examiner

*Primary Examiner* — Kevin M Burd
(74) *Attorney, Agent, or Firm* — Futurewei Technologies, Inc.

(57) ABSTRACT

Computer-implemented methods, computer software, and computer systems for adjusting receiver distortion caused by transmitter signals. A first signal is transmitted by a transmitter of the wireless terminal. A second signal is detected by a receiver of the wireless terminal. The second signal includes distortion caused by at least one of the first signal, a conjugate of the first signal, a harmonic of the first signal, or a conjugate of a harmonic of the first signal. At least one distortion coefficient is estimated in a digital domain based on the first signal and the second signal. Distortion of a third signal received by the receiver of the wireless terminal is adjusted based on the at least one distortion coefficient. Adjustment of distortion can be in the form of reduction, as well as elimination, of the distortion.

21 Claims, 5 Drawing Sheets

US 9,929,758 B2

REDUCING RECEIVER DISTORTION CAUSED BY TRANSMITTER SIGNALS

BACKGROUND

In a frequency division duplex (FDD) wireless system, such as, long-term evolution (LTE) inter-band carrier aggregation (CA), a transmitter signal or its harmonics can fall near the receiver frequency or the receiver frequency harmonics. As such, the transmitter (TX) can cause distortions that may fall completely or partially into the receiver (RX) baseband frequency, which leads to receiver sensitivity degradation or the TX-induced receiver de-sense. It is desirable to eliminate or otherwise reduce the RX distortion caused by the TX signals, especially for LTE inter-band CA that is envisioned by industry to address increasing demand from service providers for higher mobile data throughput.

SUMMARY

The present disclosure involves systems, software, and computer-implemented methods for reducing receiver distortion caused by transmitter signals.

In general, one aspect of the subject matter described here can be implemented as a method performed by data processing apparatus. The method can include transmitting a first signal by a transmitter of the wireless terminal; detecting a second signal by a receiver of the wireless terminal, the second signal comprising distortion caused by at least one of the first signal, a conjugate of the first signal, a harmonic of the first signal, or a conjugate of a harmonic of the first signal; estimating, in a digital domain based on the first signal and the second signal, at least one distortion coefficient corresponding to the at least one of the first signal, the conjugate of the first signal, the harmonic of the first signal, or the conjugate of a harmonic of the first signal; and reducing distortion of a third signal received by the receiver of the wireless terminal based on the at least one distortion coefficient.

In some instances, one aspect of the subject matter described here can be implemented as a non-transitory computer-readable medium storing instructions executable by data processing apparatus to perform operations. The operations include transmitting a first signal by a transmitter of the wireless terminal; detecting a second signal by a receiver of the wireless terminal, the second signal comprising distortion caused by at least one of the first signal, a conjugate of the first signal, a harmonic of the first signal, or a conjugate of a harmonic of the first signal; estimating, in a digital domain based on the first signal and the second signal, at least one distortion coefficient corresponding to the at least one of the first signal, the conjugate of the first signal, the harmonic of the first signal, or the conjugate of a harmonic of the first signal; and reducing distortion of a third signal received by the receiver of the wireless terminal based on the at least one distortion coefficient.

In some instances, one aspect of the subject matter described here can be implemented as a system. The system can include data processing apparatus and a computer-readable medium storing instructions executable by the data processing apparatus to perform operations. The operations include transmitting a first signal by a transmitter of a wireless terminal; detecting a second signal by a receiver of the wireless terminal, the second signal comprising distortion caused by at least one of the first signal, a conjugate of the first signal, a harmonic of the first signal, or a conjugate of a harmonic of the first signal; estimating, in a digital domain based on the first signal and the second signal, at least one distortion coefficient corresponding to the at least one of the first signal, the conjugate of the first signal, the harmonic of the first signal, or the conjugate of a harmonic of the first signal; and reducing distortion of a third signal received by the receiver of the wireless terminal based on the at least one distortion coefficient.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
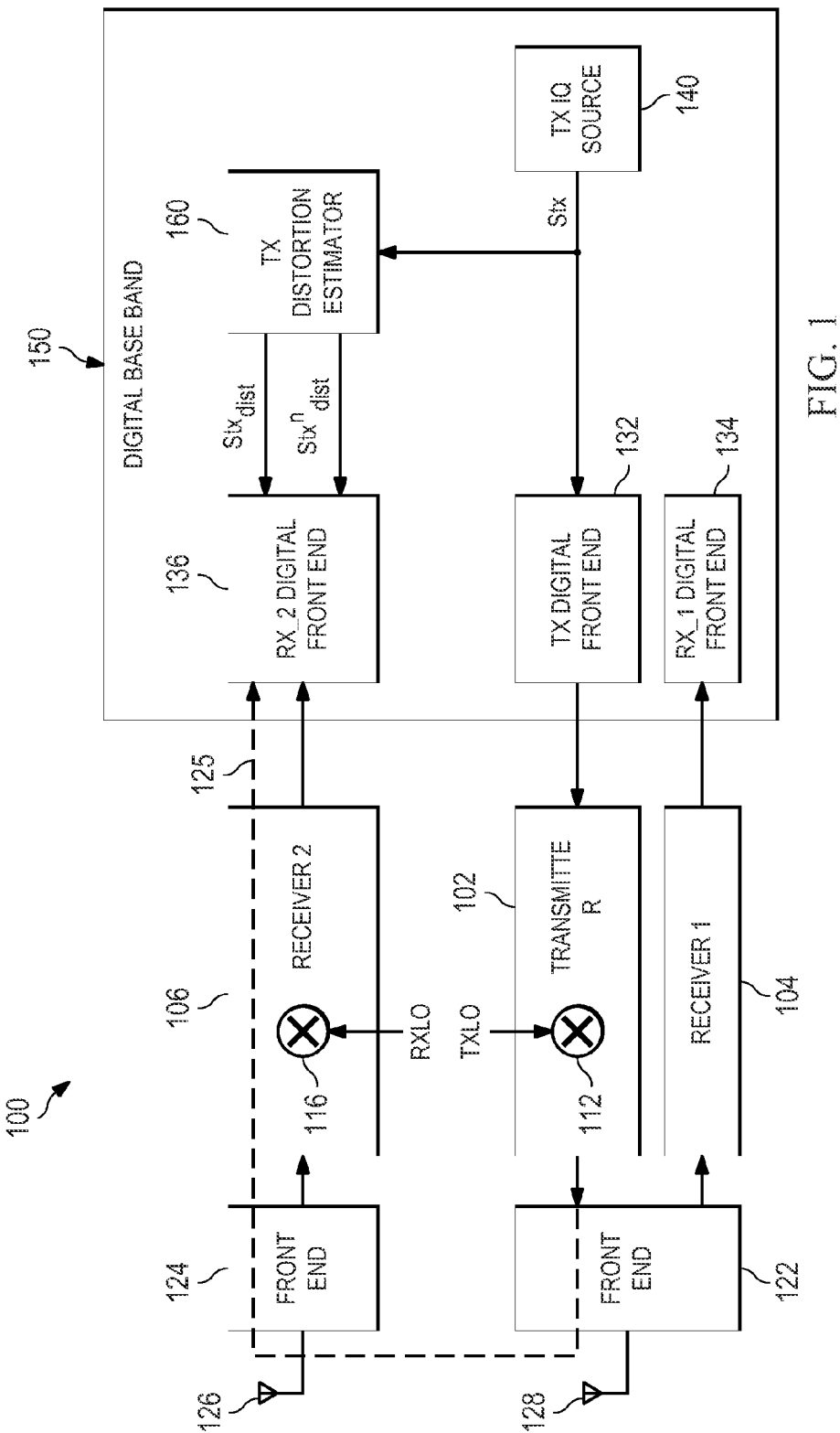
FIG. 1 is a block diagram showing an example wireless terminal capable of digital distortion adjustment under frequency division duplex (FDD) operation.

In some aspects, systems and computer-implemented methods for reducing receiver (RX) distortion caused by transmitter (TX) signals are described. The described techniques can estimate and reduce the distortions caused by the TX signals. Reducing or adjusting the distortions caused by the TX signals can include cancelling, removing, eliminating, correcting, or otherwise adjusting the distortions from the actual received signal so as to mitigate or eliminate the impact of the TX-induced distortions on the received signal.

For instance, when a wireless terminal is operating under long-term evolution (LTE) inter-band carrier-aggregation (CA) frequency duplex division (FDD) mode, a number of undesired scenarios can happen and lead to receiver de-sense caused by TX signal. For example, when the TX signal is near the harmonics of an RX signal or the RX signal is near the harmonics of the TX signal, a strong TX signal or its harmonics may be down-converted to an RX baseband and create distortions to the RX baseband signal. These scenarios can be categorized into two types.

In Case A, the TX signal harmonics fall directly into one of the receivers' frequency bands. For example, when the LTE inter-band CA with LTE Band 4 and Band 17 are used as inter-band CA, the $3^{rd}$ harmonic of the TX signal frequency of Band 17 can fall directly in Band 4 receiving frequency.

In Case B, the TX frequency itself falls onto the RX frequency's harmonics. For example, in the LTE inter-band CA case when the LTE un-licensed 5 GHz band and LTE Band 3 are used as inter-band CA, the 5 GHz band TX frequency may be in the vicinity of 3*Band 3 RX frequency. In some instances, for example, when the wireless terminal is operating near the cell edge, the power of the TX signal is typically much higher than the RX signal. When a 25% duty ratio non-overlapping quadrature mixer receiver is used, the TX signal (filtered by the RF fronted-end) will be down-converted to baseband with a conversion gain at 3*Band 3 RX frequency and de-sense the receiver.

The techniques described herein can estimate and reduce the TX-induced distortions in the digital domain. In some implementations, the example techniques identify the TX-induced distortions as one or more of a distortion caused by the TX signal, a distortion caused by the conjugate of the TX signal, a distortion caused by the harmonic of the TX signal, and a distortion caused by the conjugate of the harmonic of the TX signal. The example techniques can model the TX-induced distortions as a linear combination of these four types of distortions. The linear combination coefficients can be estimated, for example, in the digital domain based on a least square principle or other principles. In some instances, the coefficients can be estimated in the factory calibration phase. Alternatively or additionally, the coefficients can be estimated in other operation phases, such as during the transmission of data traffic by the wireless terminal. Based on the linear combination coefficients, a adjustment signal can be generated to estimate any ensuing distortions caused by the TX signal and remove it from the actually received signal.

In some implementations, a new block of a TX distortion estimator can be included in the RX baseband module as a way to reduce the TX caused distortions in an LTE inter-band CA handset receiver. In some implementations, the example techniques can simulate the center frequency of the TX-induced distortion signal by a complex frequency shift (based on the frequency of the TX local oscillator and the frequency of the RX local oscillator) with a low pass filter (LPF) to represent the RX chain filtering. In some implementations, the example techniques can include delay blocks to synchronize the distortion signals and adjustment signals.

The example techniques provide a more cost-effective option (e.g., in terms of both economic cost and development time) to reduce RX distortions caused by the TX signals. For example, the example techniques alleviate and avoid the cost and complexity in designing power amplifiers, radio frequency (RF)/analog transceivers, and additional filtering in RF front-end in the analog domain. Further, the example techniques avoid non-perfect matched RF/analog circuits, RX front-end filter loss, higher RX Noise Figure (NF), and worse sensitivity associated with the analog approaches. The example techniques can be applied without lowering the TX output power so as to make design of the analog filter within a linear response region, and therefore do not sacrifice cell coverage. In addition, the example techniques can provide a more accurate, effective, and flexible solution by estimating and cancelling the distortion in digital domain, and allowing real-time or on-demand calibration and modification of the estimation and adjustment coefficients and models. The example techniques may achieve additional or different advantages.

FIG. 1 is a block diagram showing aspects of an example wireless terminal 100 capable of digital distortion cancellation under FDD operation. The example wireless terminal 100 can support LTE CA, but it is to be appreciated that the example wireless terminal is not limited to LTE CA, and can be utilized in other LTE operations, as well as with other air interface technologies. For example, the example wireless terminal 100 can operate in intra-band mode or inter-band CA mode and can use contiguous or non-contiguous frequency bands. As such, the wireless terminal 100 can include one or more transmitters (TXs) and receivers (RXs), each configured to transmit or receive at a respective frequency band.

As shown in FIG. 1, the example wireless terminal 100 includes one TX 102 and two RXs, receiver 1 (RX1) 104 and receiver 2 (RX2) 106. The TX and RX1 share an analog front-end 122 with an antenna 128, while RX 2 106 is coupled with an analog front-end 124 with an antenna 126. The example wireless terminal 100 includes a digital baseband module 150 that includes a TX digital front-end 132, an RX1 digital front-end 134, an RX2 digital front-end 136, a TX in phase quadrature (IQ) source 140, and a TX distortion estimation module 160. The wireless terminal can include other numbers of TXs and RXs, and additional or different components, and can be configured in another manner different from the example configuration shown in FIG. 1.

In some implementations, the TX IQ source 140 generates and feeds a TX signal ($s_{tx}$) into the TX digital front-end 132. The TX signal can be a baseband signal in the digital domain and encode information to be transmitted to a receiver. The TX digital front-end 132 can perform TX impairment adjustments, TX digital gain control or any other appropriate operations in the baseband. The signal output from the TX digital front-end 132 can be up-converted to a radio frequency (RF) by a transmitter local oscillator (TXLO) 112 at the TX 102. The RF signal is input into the RF front-end 122 and transmitted via the antenna 128 into the air.

The RF front-end 122 can also detect and receive RF signals in the environment via the antenna 128. The received RF signals are fed into the RX1 for down-conversion into a baseband signal and the RX1 digital front-end 134 to perform RX digital gain control, digital filtering and impairment adjustments etc.

Similarly, the RF front-end 124 associated the RX2 can also detect and receive RF signals in the environment via the antenna 126. The received RF signals are fed into the RX2 106 for down-conversion into a baseband signal. For example, the received RF signal can be down-converted to a baseband signal by a RX local oscillator (RXLO) 116 at the RX2 106. The down-converted baseband signal can be fed into the RX2 digital front-end 136.

In some implementations, the wireless terminal 100 can operate in the LTE inter-band downlink CA mode. For example, the wireless terminal 100 can include two or more LTE inter-band CA downlinks operating at different frequency bands; and the RX1 104 and RX2 106 can be the respective receivers of the two LTE inter-band CA downlinks. In some instances, the TX signal transmitted by TX may cause distortion to the signals received by RX2. As an example, the frequency of the TXLO 112 and the frequency of the RXLO 116 may have a harmonic relationship where one is or approximates an integer multiple of the other, i.e., either $$f_{TXLO} \approx n * f_{RXLO} \quad \quad \text{Eq (1)}$$

or $$f_{RXLO} \approx n * f_{TXLO} \quad \quad \text{Eq (2)}$$

with n being an integer value greater than 1. The value n depends on operating frequency bands of the wireless terminal 100. In these cases, the TX signal or its harmonics can de-sense the RX2 and distortion induced by the TX signal may show up at RX 2 baseband as indicated with the dashed 125.

To eliminate or otherwise reduce the distortion, the TX distortion estimation module 160 can be used to estimate the distortion and reduce the distortion from the RX signal in the digital domain. For example, the TX distortion estimation module 160 can receive the TX signal generated by the TX IQ source and use it as a reference to generate an estimate of a distortion caused by the TX signal itself, $Stx_{dist}$, a distortion caused by the harmonic of TX signal, $Stx_{dist}^n$, or a combination of these and other variations of the TX signal.

For example, the distortion caused by the TX signal, $Stx_{dist}$, can further include the distortion caused by the TX signal $s_{tx}$, and the distortion caused by the conjugate of the TX signal $s^*_{tx}$. The distortion caused by the harmonic of the TX signal, $Stx_{dist}^n$, can further include the distortion caused by the harmonic of the TX signal $s_{tx}^n$ and the distortion caused by the conjugate of the harmonic of the TX signal $s^{*n}_{tx}$. In some other implementations, the TX-induced distortions can be represented in another manner.

In some implementations, assume the overall distortion signal $S_{od}$ can be represented by Eq (3):

$$S_{od} = Stx_{dist} + Stx_{dist}^n \quad \text{Eq (3)}$$
$$= b_1 * s_{tx} + a_1 * s^*_{tx} + b_n * s_{tx}^n + a_n * s^{*n}_{tx}.$$

The coefficients ($a_1$, $a_n$, $b_1$, $b_n$) of overall distortion signal $S_{od}$ in Eq (3) can be estimated based on the least mean square or other principles. For example, once a TX signal is transmitted (e.g., by the TX 102), the distortion baseband signal out(t) (e.g., output from the RX2 digital front-end 136) can be sampled at different time instances $t_1$, $t_2$, $t_3$, ..., $t_m$ and collected as out($t_1$), ..., out($t_m$), corresponding to the transmitted baseband signals $s_{tx}$ ($t_1$) ... $s_{tx}$($t_m$), respectively. m represents the number of samples collected for estimation purpose. The coefficients ($a_1$, $a_n$, $b_1$, $b_n$) can then be estimated based on the sampled signals in the digital domain.

In some instances, depending on the choices of the TXLO frequency and RXLO frequency, the distortion signal at the receiving end may not fall exactly on the center frequency of 0 Hz. For example, if $f_{TXLO}$=710 MHz, n=3, (3*$f_{TXLO}$=2130 MHz) and $f_{RXLO}$=2120 MHz, at the receiver baseband the TX distortion center frequency will be at 10 MHz. This means the TX-induced distortion signal may only partially fall into the RX baseband frequency. This effect can be captured with a complex frequency shift of the distortion signal followed by a low pass filter, for example, to represent the filtering in RX chain.

As an example implementation, define the following four distortion core signals caused by the TX signal$_{tx}$, the harmonic of the TX signal$_{tx}^n$, the conjugate of the TX signal $s^*_{tx}$ and the conjugate of the harmonic of the TX signal$s^{*n}_{tx}$ as below:

$$s_{dist}(t) = LPF(s_{tx}(t) * e^{-i*2\pi*f*t}) \quad \text{Eq (4a)}$$

$$s_{dist}^*(t) = LPF(s_{tx}^*(t) * e^{-i*2\pi*f*t}) \quad \text{Eq (4b)}$$

$$s_{dist}(t)^n = LPF(s_{tx}(t)^n * e^{-i*2\pi*f_n*t}) \quad \text{Eq (4c)}$$

$$s_{dist}^*(t)^n = LPF(s_{tx}^*(t)^n * e^{-i*2\pi*f_n*t}) \quad \text{Eq (4d)}$$

where f and $f_n$ are the center frequencies of TX-induced distortion signals determined by TXLO frequency, RXLO frequency, and harmonic relationship n.

After time alignment or other necessary operations (e.g., phase alignment, frequency offset compensation, etc.) of the frequency shifted and filtered distortion core signals ($s_{dist}(t)$, $s_{dist}^*(t)$, $s_{dist}(t)^n$, $s_{dist}^*(t)^n$) and the measured output distortion signals, out(t), (e.g., measured at the RX2 digital front-end 136), the coefficients ($a_1$, $a_n$, $b_1$, $b_n$) can be estimated by solving the matrix equation (5) below.

$$\begin{bmatrix} s_{dist}(t_1) & s_{dist}(t_1)^n & s^*_{dist}(t_1) & s^*_{dist}(t_1)^n \\ s_{dist}(t_2) & s_{dist}(t_2)^n & s^*_{dist}(t_2) & s^*_{dist}(t_2)^n \\ \cdots & \cdots & \cdots & \cdots \\ \cdots & \cdots & \cdots & \cdots \\ s_{dist}(t_m) & s_{dist}(t_m)^n & s^*_{dist}(t_m) & s^*_{dist}(t_m)^n \end{bmatrix} * \begin{bmatrix} a_1 \\ a_n \\ b_1 \\ b_n \end{bmatrix} = \begin{bmatrix} out(t_1) \\ out(t_2) \\ \cdots \\ \cdots \\ out(t_m) \end{bmatrix} \quad \text{Eq (5)}$$

Depending on the operating scenarios, only some of the coefficients are non-zero. For example, in some instances, there are only $s_{tx}$ related terms and no $s_{tx}^n$ related terms, or vice versa. In this case, the coefficients with the value of zero can be removed to simplify the estimation and improve the efficiency of the distortion adjustment.

Figure 2:
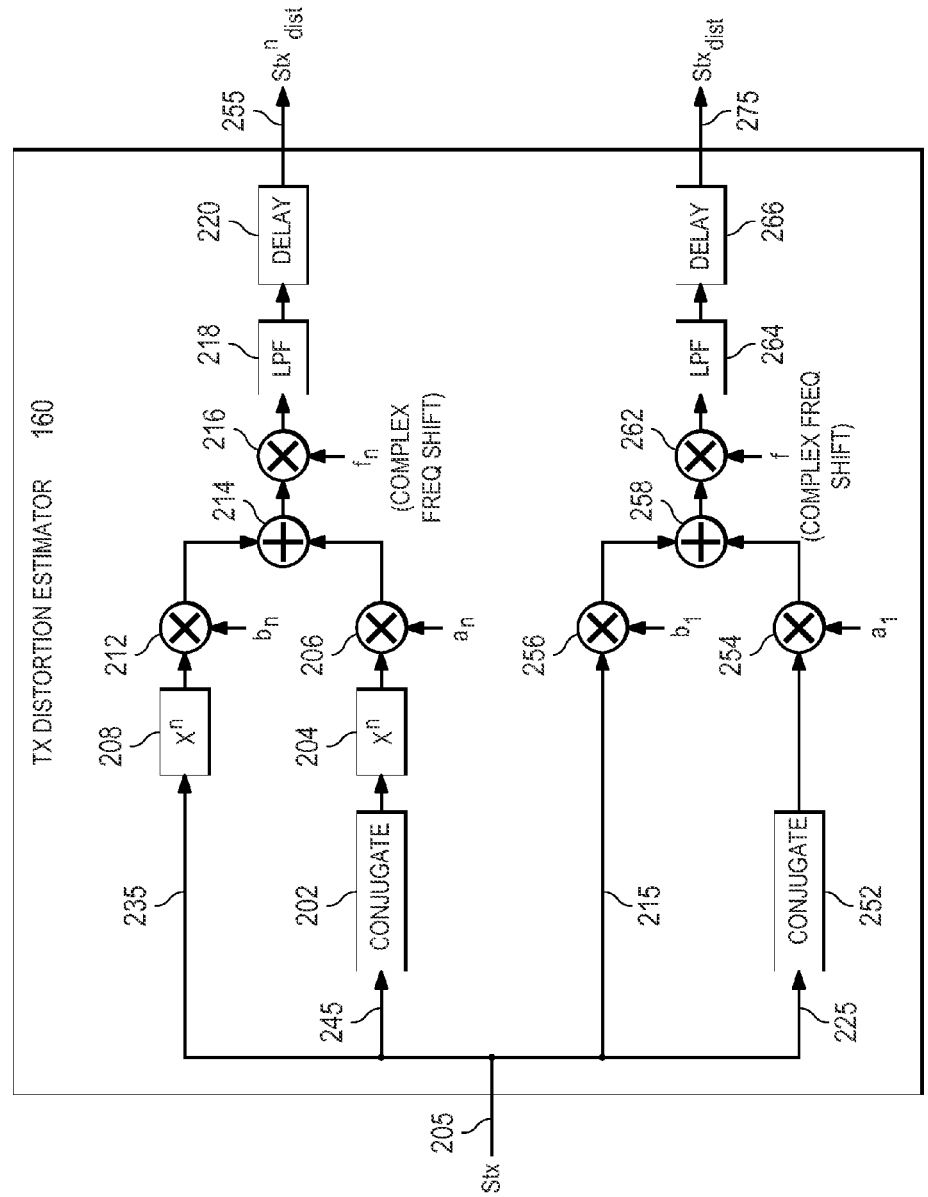
FIG. 2 is a block diagram showing an example configuration of the transmitter (TX) distortion estimator 160 of FIG. 1.

FIG. 2 is a block diagram showing an example configuration of the TX distortion estimator 160 of FIG. 1. The TX distortion estimator 160 can estimate the TX-induced distortions based on the example techniques described above. For example, the TX distortion estimation module 160 can receive the TX signal$_{tx}$ as input and include four branches 215, 225, 235, and 245 to construct the four distortion core signals according to Eqs (4a-d).

Specifically, along the branch 215, the TX signal$_{tx}$ is scaled by $b_1$ at 256 while along the branch 225 the TX signal$_{tx}$ is first conjugated at 252 and then scaled by $a_1$ at 254. The two scaled terms are added at 258 and frequency-shifted from baseband to the TXLO frequency f at 262, for example, to simulate the up-conversion by the TXLO 112 of the TX 102. The up-converted signal is then passed through a LPF 264, for example, to represent the filtering in RX chain at RX2 106 and capture any possible offset or difference between the frequency of the TX-induced distortion signal and the RX baseband frequency. In some implementations, a delay block 266 can be used to simulate the propagation delay that may exist between the actual distortion signal and the distortion signal estimated based on the TX signal to ensure they are in synchronization. The estimated distortion signal $Stx_{dist}$ based on the TX signal $s_{tx}$, and the conjugate of the TX signal $s^*_{tx}$ are output at 275.

Similarly, for the harmonic of the TX signal $s_{tx}^n$, along the branch 235, the TX signal $s_{tx}$ is converted to its nth harmonic at 208, scaled by $b_n$ at 212. Along the branch 245, the TX signal $s_{tx}$ is first conjugated at 202, converted to the nth harmonic at 204, and then scaled by $a_n$ at 206. The two scaled terms are added at 214 and frequency-shifted from baseband to the TXLO frequency $f_n$ at 216. The up-converted signal is then passed through a LPF 218 and an optional delay block 220. The estimated distortion signal $Stxl_{st}$ based on the harmonic $s_{tx}^n$ and the conjugate of the harmonic $s^{*n}_{tx}$ is output at 255.

The estimated distortion signal $Stx_{dist}^n$ and the distortion signal $Stx_{dist}$ can be sampled and the coefficients ($a_1$, $a_n$, $b_1$, $b_n$) can be estimated by solving the matrix Eq (5) as described above.

In some implementations, the estimation of the coefficients ($a_1$, $a_n$, $b_1$, $b_n$) can be performed, for example, in the factory calibration phase or other test or configuration phases. Based on the coefficients ($a_1$, $a_n$, $b_1$, $b_n$), the TX distortion estimator 160 can generate a adjustment signal and apply the adjustment signal to the actual received baseband signal (e.g., at the RX2 digital front-end 136), for example, during the operation of the wireless terminal to reduce the distortions in real time. For example, a core adjustment signal can be constructed by negating the coefficients in the Eq (3):

$$S_{corr} = -b_1 * s_{tx} - b_n * s_{tx}{}^n - a_1 * s *_{tx} + a_n * s *_{tx}{}^n \quad \text{Eq (6)}$$

The TX distortion estimator 160 can input the adjustment signal to the RX2 digital front-end 136 to subtract the adjustment signal from the actual received baseband signal to mitigate or otherwise reduce the TX-induced distortions.

In some implementations, the estimation can be performed regularly, from time to time, or on the fly during the operations of the wireless terminal to calibrate, update, or otherwise adjust the coefficients ($a_1$, $a_n$, $b_1$, $b_n$), for example, to capture frequency drifts or the operating conditions changes (e.g., temperature, voltage, etc.) that may have happened to the TX and RX chains since last estimation. As such, the distortion adjustment can be more up-to-date and effective.

Figure 3A:
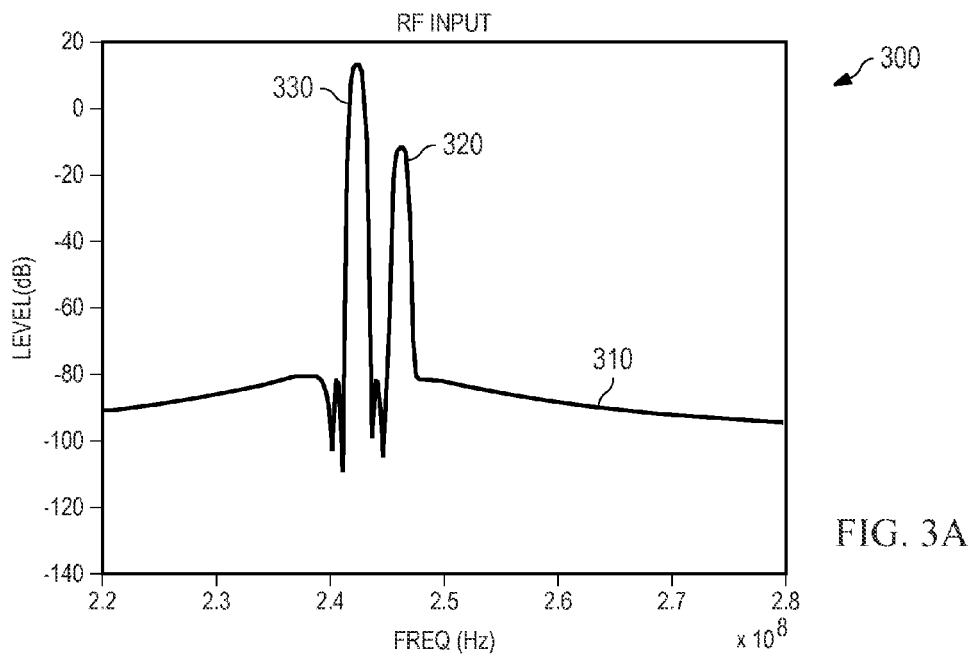
FIG. 3A is a plot showing an example receiver (RX) radio frequency (RF) input signal with TX-induced distortion.

FIG. 3A is a plot 300 showing an example RX RF input signal 310 with TX-induced distortion. FIG. 3A shows an example of Case A (described above) where the TX signal harmonics fall into the RX's frequency band, i.e., $n * f_{TXLO} \sim = f_{RXLO}$ with n being an integer greater than 1. The RX RF input signal 310 can be, for example, the input signal of the RF front-end 124 of the RX2 in FIG. 1. As shown in FIG. 3A, the example RX RF input signal 310 includes a desired RX signal 320 and an un-wanted blocker or distortion signal 330 within the receiving frequency band of the RX. The un-wanted distortion signal 330 is assumed to be generated by TX 3rd harmonic (i.e., n=3) so that frequency content can be estimated by the RX. As shown in FIG. 3A, the level of the un-wanted distortion signal 330 is 15 dB above the desired RX signal 320, which can cause significant interference that buries the desired RX signal 320 and substantially de-senses the RX.

Figure 3B:
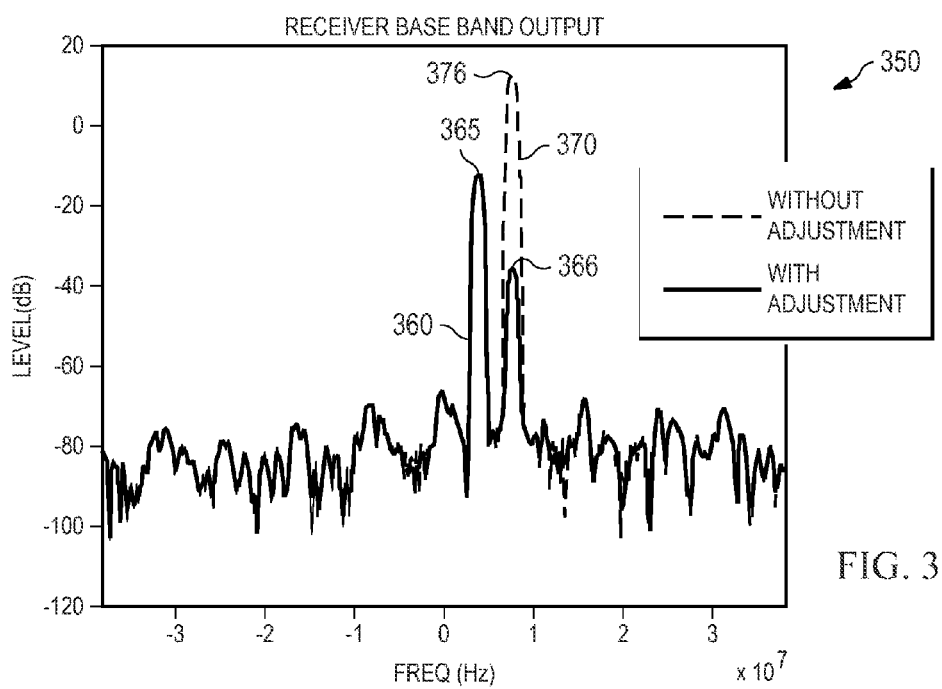
FIG. 3B is a plot showing example RX baseband output signals with and without adjustment, respectively, applied to the example RX RF input signal 310 in FIG. 3A.

FIG. 3B is a plot 350 showing example RX baseband output signals 360 and 370 that are with and without adjustment, respectively, applied to the example RX RF input signal 310 in FIG. 3A. The adjustments are performed according to the example digital distortion adjustment techniques described above. The example RX output signals 360 and 370 can be baseband signals output from the RX2 digital front-end 136, with or without applying the adjustment signal from the TX distortion estimation module 160. The RX baseband output signal 360 includes the desired RX baseband signal 365 and the adjusted distortion signal 366 caused by the $3^{rd}$ harmonic of the TX signal. In some implementations, the distortion at the baseband can be estimated by considering only terms related to $s_{tx}{}^3$ in Eq (5). The RX baseband output signal 370 without adjustment includes the desired RX baseband signal 365 and the unadjusted distortion signal 376 caused by the $3^{rd}$ harmonic of the TX signal. FIG. 3B shows the improvement of a significant distortion level reduction when the adjustment techniques are applied.

Figure 4A:
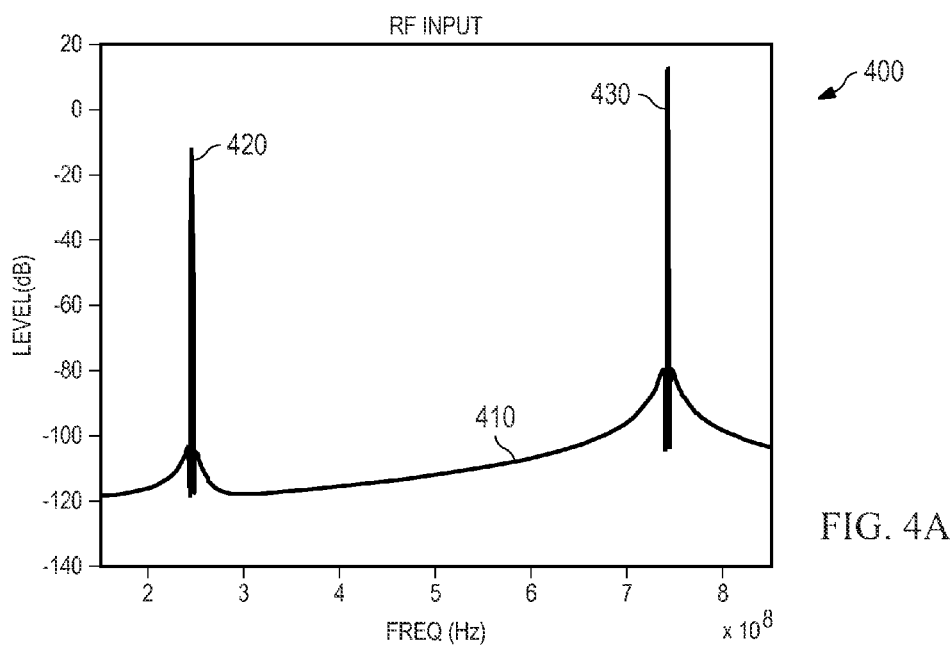
FIG. 4A is a plot showing another example RX RF input signal with TX-induced distortion.

FIG. 4A is a plot 400 showing an example RX RF input signal 410 with TX-induced distortion. FIG. 4A shows an example of the Case B where the TX frequency itself falls onto the RX frequency's harmonics, i.e. $n * f_{RXLO} \sim = f_{TXLO}$ with n being an integer greater than 1. The RX RF input signal 410 includes a desired RX signal 420 and an unwanted distortion signal 430 located at around $3 * f_{RXLO}$ (i.e., n=3). The distortion signal 430 is caused by the TX signal that is 15 dB higher than the desired RX signal. The receiver is a commonly used 25% duty ratio non-overlapping quadrature mixer receiver, which means the conversion gain for the distortion signal 430 at $3 * f_{RXLO}$ is about 9 dB lower than the desired signal gain.

Figure 4B:
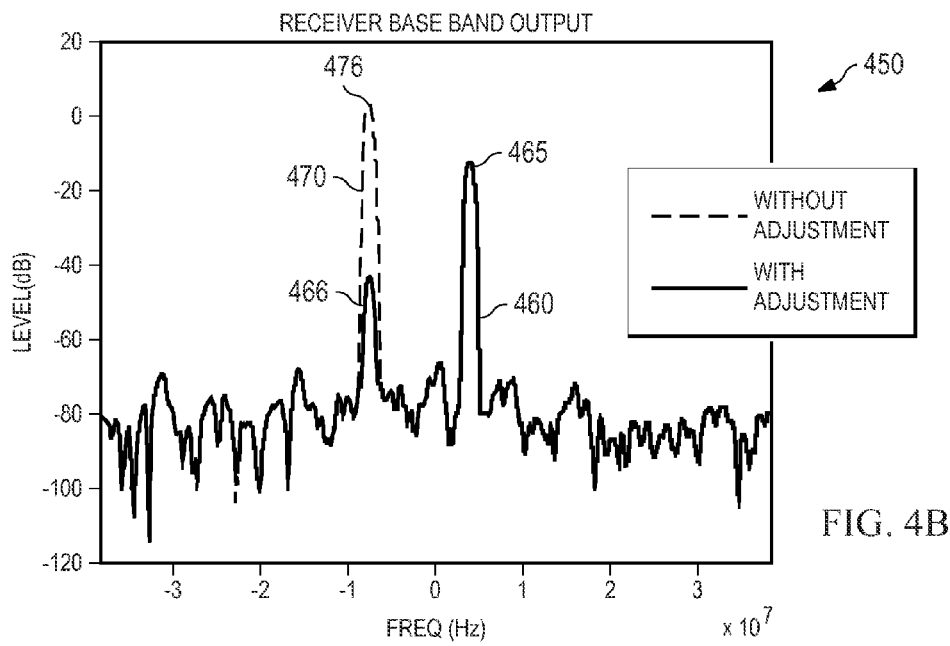
FIG. 4B is a plot showing example RX baseband output signals with and without adjustment, respectively, applied to the example RX RF input signal 410 in FIG. 3A.

FIG. 4B is a plot 450 showing example RX baseband output signals 460 and 470 that are with and without adjustment, respectively, applied to the example RX RF input signal 410 in FIG. 4A. The adjustments are performed according to the example digital distortion adjustment techniques described above. The example RX output signals 460 and 470 can be baseband signals output from the RX2 digital front-end 146, with or without applying the adjustment signal from the TX distortion estimation module 160. The RX baseband output signal 460 includes the desired RX baseband signal 465 and the adjusted distortion signal 466 caused by the TX signal $s_{tx}$. In some implementations, the distortion at the baseband can be estimated by considering only terms related to $s_{tx}$ in Eq (5). The RX baseband output signal 470 without adjustment includes the desired RX baseband signal 465 and the unadjusted distortion signal 476 caused by the TX signal $s_{tx}$. FIG. 4B shows the improvement of a significant distortion level reduction when the adjustment techniques are applied.

Figure 5:
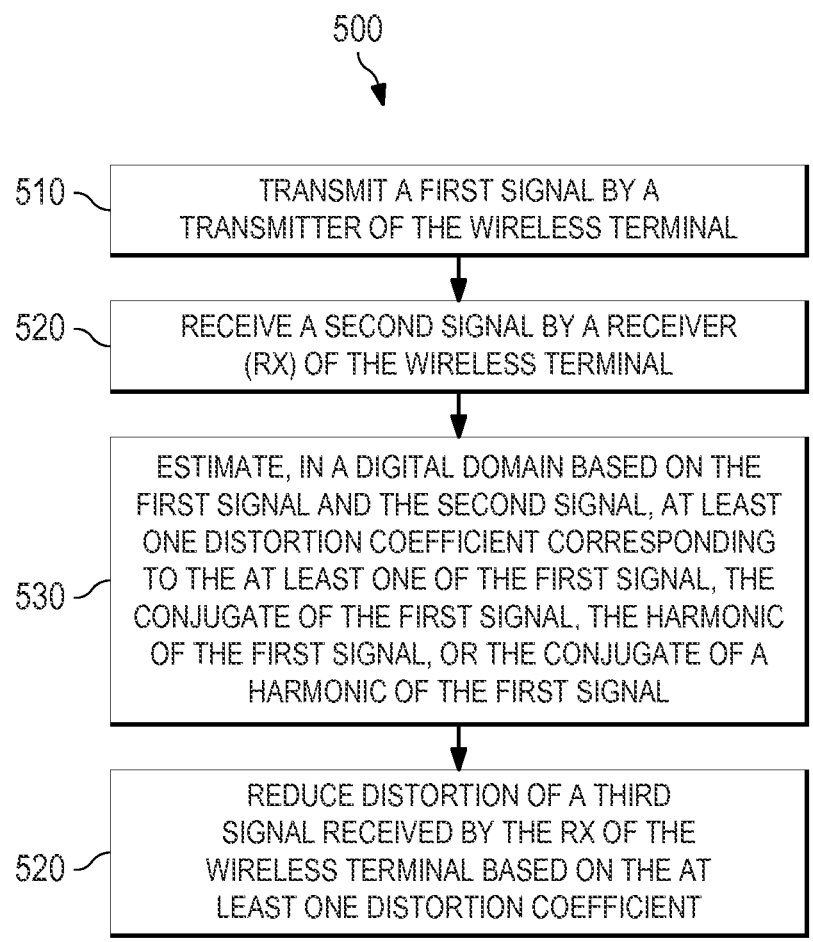
FIG. 5 is a flow chart illustrating an example process for reducing receiver distortion caused by transmitter signals.

FIG. 5 is a flow chart illustrating an example process 500 for reducing receiver (RX) distortion caused by transmitter (TX) signals. The process 500 can be implemented as computer instructions stored on computer-readable media (for example, the computer-readable medium) and executable by data processing apparatus (for example, processors) of a wireless terminal in a communication network. In some implementations, the example process 500 can be implemented as software, hardware, firmware, or a combination thereof. As an example, the process 500 can be implemented as the TX distortion estimation module 160 of the example terminal 100 in FIGS. 1 and 2. The example process 500, individual operations of the process 500, or groups of operations may be iterated or performed simultaneously (e.g., using multiple threads). In some cases, the example process 500 may include the same, additional, fewer, or different operations performed in the same or a different order.

At 510, a first signal is transmitted by a TX of the wireless terminal. The wireless terminal can be a user device, user equipment, a base station, a relay station, or other network components in a communication network. The wireless terminal is configured to transmit and receive wireless signals. Example wireless terminals include a cellular phone, a smart phone, a tablet, a computer, a computer work station, a server, a router, a base station, etc.

In some implementations, the wireless terminal can include more than one TX and/or RX. For example, the wireless terminal can operate in an LTE inter-band carrier aggregation (CA) mode and can be configured to transmit and receive wireless signals in different frequency bands using more than one TX and/or RX.

The first signal can be, for example, a signal (e.g., $s_{tx}$) transmitted by one of multiple TXs of the wireless terminal (e.g., the TX 102 of the wireless terminal 100). The first signal can be a training signal, pilot signal, or other test signal that is transmitted by the TX and made known by a RX of the wireless terminal for the purpose of estimating the TX-induced distortions to the RX of the wireless terminal. For example, the first signal can be transmitted in a factory calibration phase. In some implementations, the first signal can be a signal that includes data traffic or control information and is transmitted during the operation of the wireless terminal.

At 520, a second signal is detected by a RX of the wireless terminal. The RX can be one of multiple RXs of the wireless terminal (e.g., the RX2 106 of the wireless terminal 100). The RX can be an RX different than the RX that is associated with the TX (e.g., the RX 104 associated with the TX 102, for example, for FDD or other mode of operations). In some implementations, the RX can be an RX assigned or dedicated for one component carrier of the LTE CA while the TX that transmits the first signal is assigned or dedicated for another different component carrier of the LTE CA. The second signal can include distortion caused by the first signal. The distortion can include distortions caused by at least one of the first signal, a conjugate of the first signal, a harmonic of the first signal, or a conjugate of a harmonic of the first signal.

In some implementations, the distortion, which can be referred to as the overall distortion, can be modeled by a linear combination of a first distortion caused by the first signal, a second distortion caused by a conjugate of the first signal, a third distortion caused by the harmonic of the first signal, and a forth distortion caused by the conjugate of the harmonic of the first signal. The order of the harmonic of the first signal, n, can be larger than 2. Accordingly, the harmonic of the first signal can include a higher-than-second-order harmonic of the first signal. The linear combination of the four types of distortions can be represented by a sum of the four types of distortions weighted or scaled by respective linear combination coefficients (e.g., coefficients ($a_1$, $a_n$, $b_1$, $b_n$) in Eq (3)) or in another form.

In some implementations, a respective central frequency of one of the four types of distortions can be modeled by a complex frequency shift based on a local oscillator frequency of the TX and a local oscillator frequency of the RX and a low pass filter to represent the RX chain filtering. Eqs (4a-d) shows example representations of the four types of distortions.

In some implementations, the four types of distortions can be synchronized with the second signal by including respective delays in the modeling of the four types of distortions.

The linear combination coefficients (e.g., coefficients ($a_1$, $a_n$, $b_1$, $b_n$) in Eq (3)) correspond to the first distortion caused by the first signal, the second distortion caused by the conjugate of the first signal, the third distortion caused by the harmonic of the first signal, and the fourth distortion caused by the conjugate of a harmonic of the first signal can be referred to as distortion coefficients correspond to the first signal, the conjugate of the first signal, the harmonic of the first signal, and the conjugate of the harmonic of the first signal, respectively. The distortion coefficients can be zero or non-zero values.

At 530, at least one distortion coefficient corresponding to the at least one of the first signal, the conjugate of the first signal, the harmonic of the first signal, or the conjugate of a harmonic of the first signal is estimated in digital domain at the wireless terminal based on the first signal and the second signal. For example, the first signal and the second signal can be baseband signals, sampled and recorded at different time instances. The at least one distortion coefficient is estimated by fitting the sampled first and second signals. The at least one distortion coefficient can be estimated, for example, based on a least mean square principle by solving the Eq (5), or in another manner.

In some instances, not all four types of distortions contribute to the overall distortion. In some implementations, prior to estimating the at least one distortion coefficient, a determination is made as to which of the first signal, the conjugate of the first signal, the harmonic of the first signal, or the conjugate of a harmonic of the first signal contribute to the overall distortion, for example, based on an operating frequency of the TX and an operating frequency of the RX of the wireless terminal. The operating frequencies of the TX and RX can include the local oscillator frequencies or the operating frequency bands (e.g., the LTE CA bands) of the RX and the TX. For example, the RX and the TX can be configured to operate at particular LTE CA bands and the relation between the operation frequencies (e.g., the value of n in Eq (1) or (2)) can be determined beforehand. The particular type of distortion contributing to the overall distortion among the four types of distortions can be determined accordingly. For example, it may be determined beforehand that the overall distortion only contains one or two types of distortions. As such, only the distortion coefficient corresponding to the types of distortions that contribute to the overall distortion are non-zero. Then, the estimation of the at least one distortion coefficient can be simplified by considering only the distortion coefficient corresponding to the one or two types of distortions which contributed to the overall distortion (e.g., removing terms unrelated to the one or two types of distortions from Eq (5)).

In some implementations, the at least one distortion coefficient is estimated in a factory calibration phase, or during operations of the wireless terminal. For example, in the latter case, the at least one distortion coefficient can be calibrated, updated, or otherwise adjusted on the fly during operations of the wireless terminal, for example, to provide a more accurate and up-to-date estimation of the distortion coefficient to reflect any condition changes of the TX and RX of the wireless terminal.

At 540, distortion of a third signal received by the RX of the wireless terminal is reduced by the wireless terminal (e.g., the digital baseband module 150 of the example wireless terminal 100 in FIG. 1) based on the at least one distortion coefficient. For example, the third signal can be the second signal that includes the distortion caused by the at least one of the first signal, the conjugate of the first signal, the harmonic of the first signal, or the conjugate of a harmonic of the first signal. The third signal can be a signal other than the first signal (e.g., received by the RX during operations of the wireless terminal) that includes distortion caused by the at least one of a fourth signal (e.g., a new TX signal transmitted during operations of the wireless terminal), a conjugate of the fourth signal, a harmonic of the fourth signal, or a conjugate of the harmonic of the fourth signal.

In some implementations, reducing distortion of the third signal can include constructing an adjustment signal based on the at least one distortion coefficient and applying the adjustment signal to the third signal for reducing the distortion of the third signal. For example, the adjustment signal can be constructed in a similar manner as the modeling of the overall distortion signal except negating the at least one distortion coefficient. For example, the adjustment signal can be constructed according to Eq (6), as a linear combination, with respective negated distortion coefficients, of a distortion caused by the fourth signal, a distortion caused by the conjugate of the fourth signal, a distortion caused by the harmonic of the fourth signal, and a distortion caused by the conjugate of the harmonic of the fourth signal. The adjustment signal can be added to the third signal to reduce the overall distortion of the third signal. In some implementations, the distortion of the third signal is reduced by directly subtracting the overall distortion modeled by the linear combination, with the respective estimated distortion coefficients, of the distortion caused by the fourth signal, the distortion caused by the conjugate of the fourth signal, the distortion caused by the harmonic of the fourth signal, and the distortion caused by the conjugate of the harmonic of the fourth signal.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them)

by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be realized in a computing system that includes a back-end component, for example, a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a wireless terminal, the method comprising:
   transmitting, by a transmitter of the wireless terminal, a modulated first signal;
   detecting, by a receiver of the wireless terminal, a second signal that comprises distortion caused by a conjugate of the first signal and a conjugate of a harmonic of the first signal;
   digitally estimating in a time domain, based on the first signal and the second signal, at least one distortion coefficient corresponding to the conjugate of the first signal and the conjugate of the harmonic of the first signal; and
   reducing distortion of a third signal received by the receiver of the wireless terminal based on the at least one distortion coefficient.

2. The method of claim 1, wherein the wireless terminal is operating in a long-term evolution (LTE) inter-band carrier aggregation (CA) mode.

3. The method of claim 1, wherein estimating at least one distortion coefficient comprises estimating the least one distortion coefficient based on a least mean square principle.

4. The method of claim 1, wherein estimating at least one distortion coefficient comprises estimating the least one distortion coefficient in a factory calibration phase.

5. The method of claim 1, further comprising adjusting at least one distortion coefficient comprises estimating the least one distortion coefficient during operations of the wireless terminal.

6. The method of claim 1, further comprising:
   modeling the distortion caused by the conjugate of the first signal and the conjugate of the harmonic of the first signal by a linear combination of a first distortion caused by the conjugate of the first signal and a second distortion caused by the conjugate of the harmonic of the first signal; and
   wherein the distortion coefficient corresponding to the conjugate of the first signal and the conjugate of the harmonic of the first signal is a linear combination coefficient corresponding to the first distortion caused by the conjugate of the first signal and the second distortion caused by the conjugate of the harmonic of the first signal.

7. The method of claim 6, further comprising modeling a respective central frequency of one of the first distortion caused by the conjugate of the first signal and the second distortion caused by the conjugate of the harmonic of the first signal by a complex frequency shift based on a local oscillator frequency of the transmitter and a local oscillator frequency of the receiver and a low pass filter.

8. The method of claim 6, further comprising synchronizing at least one of the first distortion caused by the conjugate of the first signal or the second distortion caused by the conjugate of the harmonic of the first signal, with the second signal by a delay.

9. The method of claim 1, wherein reducing distortion of a third signal received by the receiver of the wireless terminal based on the at least one distortion coefficient comprises:
   constructing an adjustment signal based on the at least one distortion coefficient; and
   applying the adjustment signal to the third signal to reduce distortion of the third signal.

10. The method of claim 1, wherein
   the second signal further comprising distortion caused by the first signal and a harmonic of the first signal; and
   the at least one distortion coefficient further corresponding to the first signal and the harmonic of the first signal.

11. The method of claim 1, wherein the harmonic of the first signal comprises a higher-than-second-order harmonic of the first signal.

12. A non-transitory computer-readable medium storing instructions executable by data processing apparatus to perform operations comprising:
   transmitting a modulated first signal;
   detecting a second signal that comprises distortion caused by a conjugate of the first signal and a conjugate of a harmonic of the first signal;
   digitally estimating in a time domain, based on the first signal and the second signal, at least one distortion coefficient corresponding to the conjugate of the first signal and the conjugate of a harmonic of the first signal; and
   reducing distortion of a third signal received by a receiver of the wireless terminal based on the at least one distortion coefficient.

13. The medium of claim 12, wherein the wireless terminal is operating in an LTE inter-band carrier aggregation (CA) mode.

14. The medium of claim 12, wherein estimating at least one distortion coefficient comprises estimating the least one distortion coefficient based on a least mean square principle.

15. The medium of claim 12, wherein estimating at least one distortion coefficient comprises estimating the least one distortion coefficient in a factory calibration phase.

16. The medium of claim 12, wherein reducing distortion of a third signal received by the receiver of the wireless terminal based on the at least one distortion coefficient comprises:
   constructing an adjustment signal based on the at least one distortion coefficient; and
   applying the adjustment signal to the third signal to reduce distortion of the third signal.

17. A wireless terminal comprising:
   a non-transitory memory comprising instructions; and
   one or more processors in communication with the data processing apparatus and to the memory, wherein the one or more processors execute the instructions to perform the steps of:
   transmitting a modulated first signal;
   detecting a second signal that comprises distortion caused by a conjugate of the first signal and a conjugate of a harmonic of the first signal;
   digitally estimating in a time domain, based on the first signal and the second signal, at least one distortion coefficient corresponding to the conjugate of the first signal and the conjugate of the harmonic of the first signal; and
   reducing distortion of a third signal received by a receiver of the wireless terminal based on the at least one distortion coefficient.

18. The wireless terminal of claim 17, wherein the wireless terminal is operating in an LTE inter-band carrier aggregation (CA) mode.

19. The wireless terminal of claim 17, wherein estimating at least one distortion coefficient comprises estimating the least one distortion coefficient in a factory calibration phase.

20. The wireless terminal of claim 17, the operations further comprising adjusting at least one distortion coefficient comprises estimating the least one distortion coefficient during operation of the wireless terminal.

21. The wireless terminal of claim 17, wherein reducing distortion of a third signal received by the receiver of the wireless terminal based on the at least one distortion coefficient comprises:
   constructing an adjustment signal based on the at least one distortion coefficient; and
   applying the adjustment signal to the third signal to reduce distortion of the third signal; and
   synchronizing the adjustment signal and the third signal.

* * * * *